(12) United States Patent
Kritchman et al.

(10) Patent No.: US 9,242,411 B2
(45) Date of Patent: Jan. 26, 2016

(54) METHOD AND APPARATUS FOR MONITORING ELECTRO-MAGNETIC RADIATION POWER IN SOLID FREEFORM FABRICATION SYSTEMS

(75) Inventors: Eliahu M. Kritchman, Tel Aviv (IL); Alexander Libinson, Holon (IL); Moshe Levi, Tel-Aviv (IL); Guy Menchik, Ra'anana (IL)

(73) Assignee: STRATASYS LTD., Rehovot (IL)

( * ) Notice: Subject to any disclaimer, the term of this patent is extended or adjusted under 35 U.S.C. 154(b) by 1390 days.

(21) Appl. No.: 12/349,512

(22) Filed: Jan. 6, 2009

(65) Prior Publication Data

US 2010/0173096 A1    Jul. 8, 2010

(51) Int. Cl.
*B29C 67/00*    (2006.01)
(52) U.S. Cl.
CPC ......... *B29C 67/0059* (2013.01); *B29C 67/0088* (2013.01)

(58) Field of Classification Search
CPC .................................................. B29C 67/0059
USPC ........................................................... 264/406
See application file for complete search history.

(56) References Cited

U.S. PATENT DOCUMENTS 4,665,627 A * 5/1987 Wilde et al. ..................... 34/278
2003/0151167 A1 * 8/2003 Kritchman et al. ............. 264/401

* cited by examiner

*Primary Examiner* — Larry Thrower
(74) *Attorney, Agent, or Firm* — Pearl Cohen Zedek Latzer Baratz LLP (57) ABSTRACT

Embodiments of the present invention are directed to a system and method for controlling fabrication of three-dimensional objects, layer by layer, the system comprising a printing assembly, including an irradiation unit and a printing head, the printing assembly is movable between a printing area and a service area. A light sensor positioned at the service area to measure output radiation power of the irradiation unit at a printing plane and a controller to receive information from the sensor and to automatically adjust electrical power supplied to the irradiation unit based on the information.

6 Claims, 6 Drawing Sheets

METHOD AND APPARATUS FOR MONITORING ELECTRO-MAGNETIC RADIATION POWER IN SOLID FREEFORM FABRICATION SYSTEMS

BACKGROUND OF THE INVENTION

In three-dimensional printing, building material is selectively jetted from one or more printing heads and deposited onto a fabrication tray in consecutive layers according to a pre-determined image data. In printing machines that utilize photopolymers as building material, the liquid layers are solidified, conditioned or cured using a radiation source. The radiation source may emit light such as ultraviolet (UV) light according to predetermined working parameters, such as output radiation intensity and spectral region. Formation of high-quality 3D objects requires maintaining the radiation power and wavelength region substantially constant. For example, the radiation power may only vary within ±5%-±10%. The intensity of the light source, however, may decrease in more that 10% from various reasons including deterioration of the light source, deterioration of a reflector of the light source, appearance of mist or undesired splashes of material on the protective glass of and the like. Further, the desired spectral region of the light source may shift so that light may be at less effective wavelengths. Accordingly, there is a need to monitor the radiation power and other characteristics of the radiation source.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device which may be included in a printing machine, that may manipulate and/or transform data represented as physical (e.g., electronic) quantities within the computer's registers and/or memories into other data similarly represented as physical quantities within the computer's registers and/or memories or other information storage medium that may store instructions to perform operations and/or processes by the printing machine or elements, parts, modules or units of a printing machine.

Some embodiments of the present invention may be implemented in software for execution by a processor-based system. For example, embodiments of the invention may be implemented in code and may be stored on a computer-storage medium having stored thereon instructions which can be used to program a system to perform the instructions. The computer-storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Such a system may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of printing heads" may include two or more printing heads.

The terms "layer" and "object layer" are used throughout the specification and claims to describe any lamina or film that may represent a cross-section or slice of a 3D object. A layer may be formed and adhered to previously formed and adhered layers in a "layer by layer" fashion to create, build up or form a 3D object.

The terms "X direction" and "Y direction" as used throughout the specification and claims refers to directions parallel to a fabrication tray that are indicative of relative movement between a dispensing head (printing head) or a printing assembly and the fabrication tray during selecting dispensing of material from nozzles of the dispensing head onto the fabrication tray. The relative movement may be achieved by moving the dispensing head while the tray is kept motionless, by moving the fabrication tray while keeping the dispensing head motionless or by moving both the printing head and the fabrication tray. The term "Z direction" as used herein throughout the specification and claims refers to a direction perpendicular to both the X and Y directions The Z direction is indicative of the direction in which the consecutive layers are formed.

Embodiments of the present invention are directed to a system and method for monitoring the output radiation power and controlling the input power supply to an irradiation source that emits Electro-Magnetic (E-M) radiation during the process of fabrication of 3-dimensional objects. According to embodiments of the invention, the system may include a printing assembly movable between a printing area and a service area. The printing assembly may include an irradiation unit and a printing head, such as an inkjet printing head. The system may further include, a light sensor positioned at the service area to measure output radiation power of the irradiation unit and a controller to receive information from the sensor and to automatically adjust the electrical power supplied to the irradiation unit based on that information.

Figure 1:
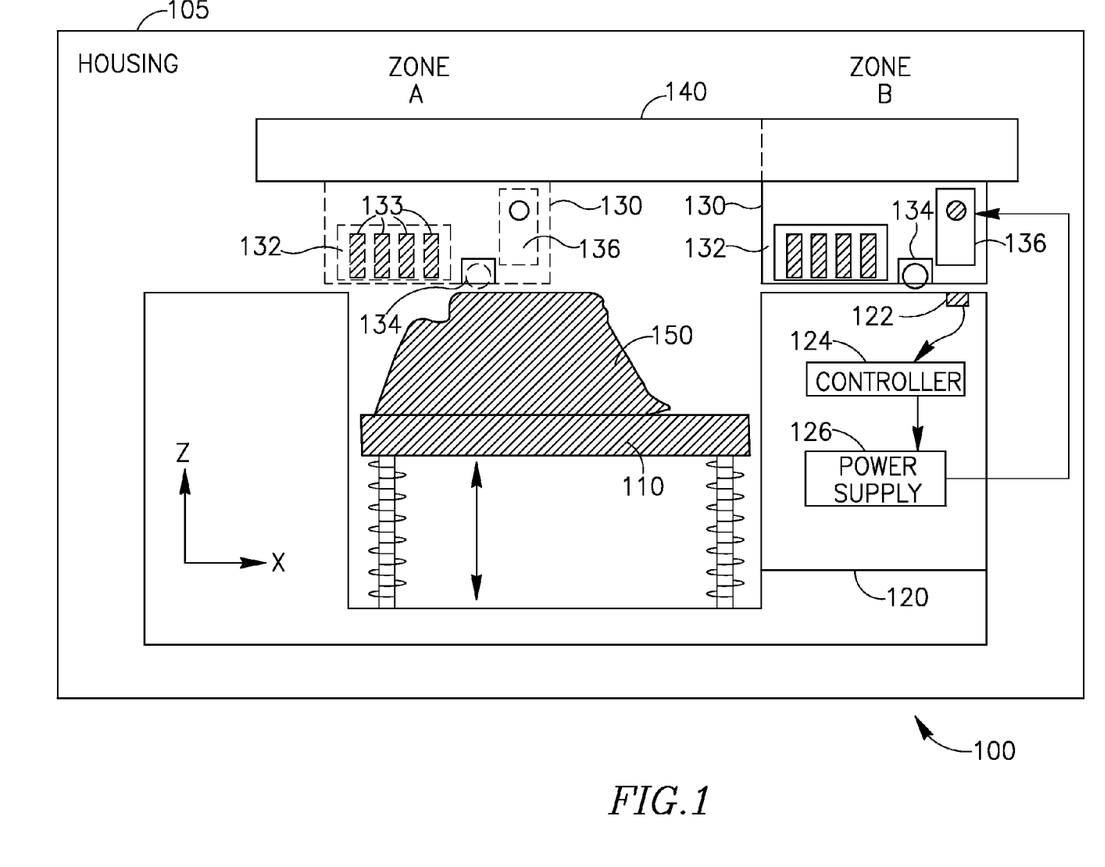
FIG. 1 is a schematic illustration of an exemplary 3D printing system having embedded radiation monitoring and controlling capabilities according to embodiments of the invention.

Reference is now made to FIG. 1, which is a schematic illustration of an exemplary three-dimensional printing system having embedded radiation monitoring and controlling capabilities according to embodiments of the invention. A three-dimensional dispensing or printing system 100 may include a housing 105 that may comprise a fabrication platform or tray 110, a light monitoring module or unit 120 and a printing assembly 130. Printing assembly 130 may include a dispensing unit, such as inkjet printing unit 132 having one or more printing heads to dispense printing material, layer by layer onto platform 110, a leveling device 134 to flatten or roll out the printing material of the printed layers and an irradiation source or unit 136 to condition or cure the printing material during the formation of an exemplary three-dimensional object 150. Printing assembly 130 may be positioned in a "printing area" (Zone A of FIG. 1) or in a "service area" (Zone B of FIG. 1). Although in the exemplary embodiment of FIG. 1, a single irradiation unit is illustrated, it should be understood to a person skilled in art that the invention is not limited in this respect and according to embodiments of the present invention any suitable numbers of irradiation units may be used. The curing may be carried out after the deposition of each layer of object 150 or after the deposition of more than one layer.

Printing unit 132 may be, for example, an ink jet unit having one or more printing heads 133. Each printing head may include a plurality of dispensing nozzles arranged in an array of one or more rows along the longitudinal axis of printing head 133. Printing assembly 130 may be coupled to a conveyance unit 140 to allow printing assembly 130 to move or slide across fabrication tray 110 in both X and Y directions. Printing assembly 130, tray 110 or both printing assembly 130 and tray 110 may move in the Z direction.

According to embodiments of the invention, printing assembly 130 may be at a fixed location in the Z direction and platform 110 may be capable of moving in the Z direction away from printing assembly 130 to ensure that during printing the vertical distance between the printing unit 132 and the top layer of the object to be printed remains constant. The term "printing plane" as used herein throughout the specification and claims refers to a plane (X-Y plane) parallel to the top surface of the fabrication platform, where the plane includes the Z position of the top surface onto which a layer is deposited. By varying the position of the fabrication platform in the Z direction, the vertical distance between the printing plane and printing assembly 130 is maintained fixed. It should be understood to a person skilled in the art that the top surface defining the printing plane refers to the top layer of the object being formed or to the fabrication platform when the first layer is being deposited.

Monitoring module 120 may include a light sensor, radiation sensor or light detector 122, a controller 124 and a power supply 126. Sensor 122 may detect and measure the output radiation power of irradiation unit 136 and may transmit the data to controller 124. The intensity of light at a particular point depends on the distance from the irradiation unit to that particular point.

According to embodiments of the invention, sensor 122 may be located or positioned at a Z position that corresponds to the printing plane, namely, the sensor is located at the plane of the top layer of the 3D object being formed. In this location sensor 122 may experience the same irradiation power per unit area as the newly dispensed layer. The curing capability of radiation is a function of the total radiation power impinging on the layer (given a radiation spectrum), as well as a function of the density of the irradiating radiation. For example, two irradiation units of the same spectral content and radiation power that have different focus characteristics (i.e. one of which has a larger irradiation power per unit area of the irradiated surface than the other) may have different curing power. The irradiation unit with the denser radiation may have superior curing capability. Sensor 122 may be located at the printing plane to detect the relevant radiation power density in order to control the radiation power of irradiation unit 136. According to other embodiments, sensor 122 may be movable in the Z direction and various measurements may be carried out at various Z planes.

According to embodiment of the invention, Sensor 122 may include a filter to measure output radiation power of irradiation unit 136 only at a desired portion of the spectral range of the illuminating radiation. The desired spectral range of sensor 122 may be determined according to the curing characteristics of the materials that are to be used as building materials for the 3D objects. Irradiation unit 136 may output E-M radiation, in a wide spectral range, for example, in the range between 100 nanometer (nm) and 1000 nm. Depending on the specific characteristics and compositions of the building materials used for the formation or fabrication of the 3D object, a narrower range of the spectrum may effectively influence the photo-polymerization process occurring during radiation of the building materials. The spectrum range which may effectively stimulate the photo-polymerization process is referred to herein as "the effective range". The effective range is the range of wavelengths of high curing efficiency. The spectral range that the filter of sensor 122 may transmit is preferably in the effective range. For example, for certain building material, the effective wavelength range may be the UV-B range, e.g., between 280 nm and 315 nm. Accordingly, the selected filter may transmit the power only in the UV-B range. Alternatively, a sensor with an inherent sensitivity which may match the effective range may be used.

The term "curing efficiency" is used throughout the specification and claims to describe the ability of radiation at a given wavelength range to cure a given material. More specifically, curing efficiency is the ratio between the rate of polymerization to the irradiation power of a narrow band wavelength range, per unit wavelength of the radiation. "The rate of polymerization" may refer to the amount per unit time of small molecules (e.g. monomers) that combine with each other under the irradiation, forming polymer molecules. This definition is somewhat ambiguous, since, for example, the same number of monomers can be combined (in one case) into many polymer molecules, each comprising 100 joint monomers, or (in another case) into fewer polymer molecules, each comprising 1000 joint monomers, with different polymer characteristics between the two. But the quantity can serve as a useful tool when comparing interaction of a given material at a given environmental and layout conditions, irradiated by radiation at different wavelengths.

According to embodiments of the invention, irradiation unit 136 may cure the building material during formation of object 150. The building may have a first curing efficiency within a first range of wavelengths a second curing efficiency, lower than the first curing efficiency, within a second range of wavelengths. Light sensor 122 may be substantially responsive to radiation at the first range of wavelengths and non-responsive to radiation at the second range of wavelengths. It should be understood to a person skilled in the art that the higher curing efficiency range may be at longer or shorter wavelengths than the lower curing efficiency range.

Controller 124, such as a microprocessor, may control the input power supply to irradiation unit 136 by adjusting parameters of power supply element 126 based on the data received from sensor 122. When the data received from sensor 122 relates only to the effective range, the adjustment made to the input power supply may be aimed at obtaining a desired output radiation power at that range.

Controller 124 may include other functions, for example controlling the printing process including the movement of printing assembly 130. Controller 124 may include computer-storage medium having stored thereon instructions for printing assembly 130 to perform movements including moving to position or zone "B" above light monitoring unit 120 to enable sensor 124 to detect the output radiation power of irradiation unit 136. Alternatively, the movement of printing assembly 130 may be controlled by another controlling unit (not shown).

Irradiation unit 136 may irradiate layers of printed object 150 with E-M radiation in order to condition or cure the printed layers of object 150. The layers may include one or more building materials. Building materials may be photopolymers, e.g., photo-curable material. Photo-curable materials may include, for example, photo-curable molecules such as reactive acrylates and photo-initiator molecules. Different photo-initiators may be sensitive to different wavelength ranges of the E-M spectrum such as ultra violet (UV) radiation or only a portion of the UV range such as UV-A, UV-B, UV-C, and/or visible light or infra red (IR) radiation. For example, a photo-initiator which is more sensitive to UV radiation than to other wavelength ranges is IRGACURE 819™ of Ciba Specialty Chemicals, Basel, Switzerland. Therefore the effective wavelength range of photo-curing of building material that comprises IRGACURE 819™ is the UV range. Different UV sources may be mostly effective in exciting the photo-initiators, e.g., IRGACURE 819™, in the building materials at different portions of the UV spectrum.

According to embodiments of the invention, a radiation sensor that is particularly sensitive in the effective range may be selected.

Some demonstrative embodiments of the invention may refer to using ultraviolet (UV) light to cure layers of one or more building materials. It will be appreciated, however, by those skilled in the art that in other embodiments of the invention, light of any other suitable spectrum may be used.

During operation of irradiation unit 136, E-M radiation power may decrease with time. The decrease in the E-M radiation may occur due to deterioration or weakening of physical components of irradiation unit, such as for example, a reflector, a cover glass or radiation source in irradiation unit 136. For example, a reflector or glass may be coated by contamination which may result from photopolymer mist that accompanies photopolymer jetting during formation or fabrication of object 150.

Optimal E-M radiation power is required for best printing quality. For example, smaller radiation power than the optimal radiation power may result in weak printed objects, round edges and/or non smooth vertical elements of the printed object. Higher radiation power than the optimal radiation power may cause extra deformation of the objects and may prevent the required partial solidification of the support material. In order to achieve a quality printing a stable radiation power should be preserved within a tolerance of around 5%-10% of the optimal radiation power.

Figure 2:
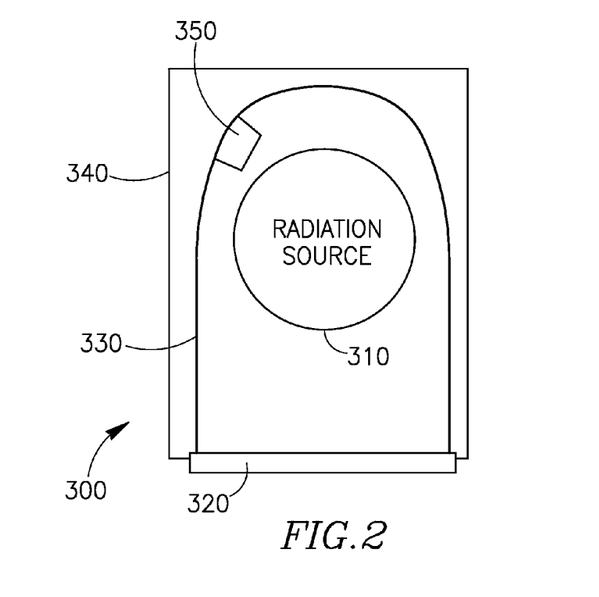
FIG. 2 is a schematic illustration of an exemplary irradiation unit assembly according to embodiments of the invention.

Reference is now made to FIG. 2, which is a schematic illustration of an exemplary irradiation unit assembly according to embodiments of the invention. Irradiation unit assembly 300 may be, for example, irradiation unit 136 of FIG. 1 and may include radiation source 310 and a reflector 330 both contained within a housing 340 having a protective glass window 320. Reflector 330 may reflect the light radiated from radiation source 310 to increase efficiency of irradiation unit 300. Protective glass window 320 may be made of a transparent to UV material, such as a fused silica glass, and may protect radiation source 310 and reflector 330 from contamination and external damage.

According to some embodiments of the present invention, a second optical sensor 350 may be located within housing 340 between reflector 330 and radiation source 310 to measure output radiation power directly from radiation source 310. In this embodiment other elements such as reflecting surface 330 or protective glass 320 may not influence the sensed radiation. Comparing between measurements of the first and second sensors may enable controller 124 to differ between the influence of the radiation power emitted from radiation source 310 and the influence on the total output power radiation unit 300 brought by other factors, like the reflectivity of reflector 330 or the transparency of protective glass 320. In some embodiments, second sensor 350 may be directly attached or connected to reflector 330. In other embodiments, sensor 350 may be attached to an optical fiber in such a way that one end of the fiber may be placed inside reflector 330 and the other end of the fiber may be attached to an optical sensor that may be mounted far from radiation source 310 so as to prevent heating of sensor 350 during operation of radiation source 310.

Sensor 350 may provide information on degradation of radiation source 310. Data from sensor 350 related to direct radiation power of the radiation source as well as data from sensor 122 of FIG. 1 related to radiation power of the irradiation unit at the printing plane may be transferred to controller 124 of FIG. 1. The ratio between the data received from sensor 350 and sensor 122 may be used to correctly adjusting and servicing the irradiation unit assembly 130. A relative decrease of the radiation sensed by sensor 122 larger than the relative decrease sensed by sensor 135, may be an indication that either the reflection characteristics of the reflecting surface, e.g., reflector 330, has been deteriorated, or the transparent window 320 is contaminated. As a response controller 124 may prompt an operator or a user to either replace reflector 330 or clean window 320. In case this does not help, or the user prefers not to service the unit, controller 124 may adjust the radiation power of radiation source 310 in a way that the radiation power sensed by sensor 122 is as required.

Although in the exemplary illustrations of FIG. 2, irradiation unit assembly may include an irradiation source, a reflector and a housing having a protection glass, it should be understood to a person skilled in art that the invention is not limited in this respect and according to embodiments of the present invention any suitable assembly may be used. In addition irradiation unit assembly 300 may include any other component, element or device.

Figure 3:
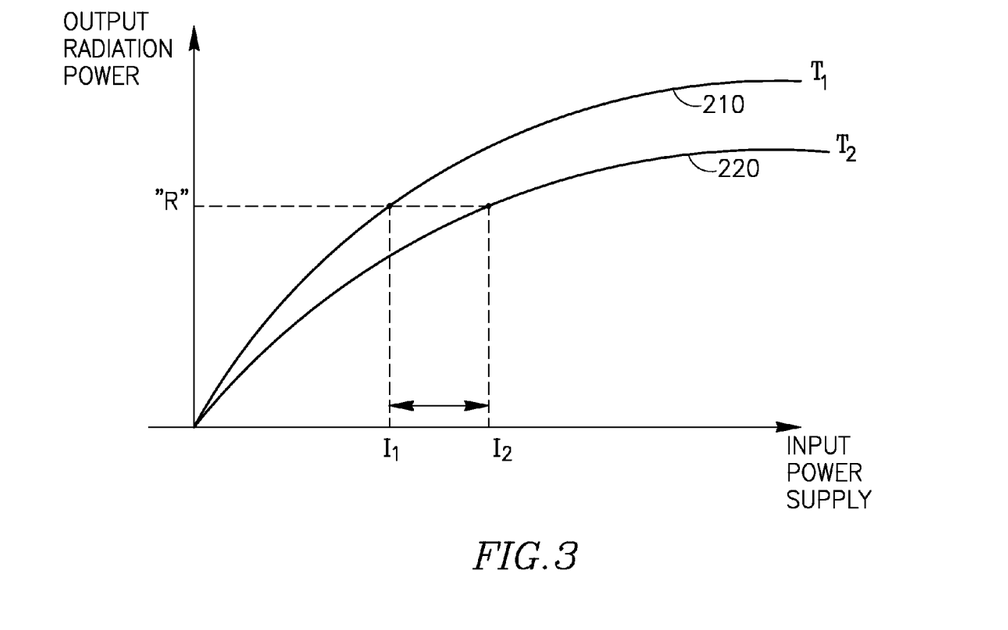
FIG. 3 is a graph representing the relationship between the electrical input power and the radiation output power of an irradiation unit helpful in demonstrating embodiments of the invention.

FIG. 3 is an illustrative graph representing the decreasing of the output radiation power of an irradiation unit due to normal weariness. X axis represents the electrical input power supply supplied to the irradiation unit from a power supplied and Y axis represents the output radiation power emitted by the irradiation unit.

A first curve 210 represents the measured output radiation power of an irradiation unit as a function of input power supply at a first time $T_1$ when the irradiation unit is new and a second curve 220 represents the output radiation power of the same irradiation unit as a function of input power supply at a second time $T_2$ representing a time later than the first time and after the irradiation unit has been used. The phenomenon of decrease in efficiency of the irradiation unit, e.g., the ratio between radiation power and electrical power is demonstrated by the change from curve 210 to curve 220.

For example, a desired value of output radiation power of irradiation unit 136 may be determine to be at a value designated "R". The measurements of the output radiation power may include the entire spectrum of light emitted from the irradiation unit. However, the output radiation may not be in constant relation to curing capability since it may contain radiation that is not effective in curing. For example if the ratio between the radiation power in the curing-effective range of wavelength to that in the curing-non-effective range alters with time, the required value "R" may alter with time as well. According to embodiments of the invention, the measurements of the output radiation power may be limited to only a portion of the spectrum of light emitted from the irradiation unit, for example the UV-B range which is effective in curing. In this case "R" may be constant over the entire life time of the irradiation unit.

The value "R" may be obtained at time $T_1$ when the irradiation unit is new by applying an input power supply of value $I_1$. In order to obtain the same output radiation power "R" at time $T_2$, when the efficiency of irradiation unit has decreased, the input power supply value should be raised to a value of $I_2$. In order to maintain the desired output radiation power by adjusting input power supply or alternatively by replacing the irradiation unit the behavior, characteristics and/or other attributes of irradiation unit 136 may be monitored by monitoring unit 120.

According to embodiments of the invention, printing assembly 130 may move to the service area (zone "B") for example immediately after completion of fabrication of a three-dimensional object when the irradiation unit is still hot. Then, monitoring unit 120 may perform monitoring and controlling of irradiation unit 136. It should be understood that the monitoring and calibration operations may take place at any time during, before or after the fabrication process. For example, printing head 130 may be located in position "B" before starting a printing process, after finishing a printing process, or anytime during the printing process, e.g., after printing of each layer or after printing of a plurality of layers. In addition, the monitoring may be performed by monitoring unit 120 at any required frequency, for example, on a daily or weekly basis.

Although the invention is not limited in this respect, controller 124 may control sensor 122 and power supply 126 in order to calibrate printing apparatus 100. First, controller 124 may control power supply 126 to supply a certain amount of input power to irradiation unit 136. Then, the output radiation power of light emitted from irradiation unit 136 may be measured by sensor 122 for that input power supply. Next, controller 124 may instruct sensor 122 to perform a plurality of such measurements for various input power supply values. Then, based on a desired output radiation power value and the measurements, the input power supply may be adjusted. The measurements of output power as a function of input power may provide controller 124 with the required information regarding irradiation unit performance and may enable controller 124 to automatically determine the amount of input power required to be supplied to irradiation unit 136 in order to obtain the desired output radiation power. Sensor 122 may automatically monitor or measure the output radiation power without any intervention of a service personnel or a user, for example, without removing printed object 150 from printing tray 110 and without the need to interrupt the printing process and to install external measuring devices. Controller 124 may use the monitoring results received from the sensor by performing calculations, estimations or any other processing operations, such as for example, generating curves such as curve 220, generating a look up table, running dedicated software and the like.

According to embodiments of the present invention, controller 124 may control the input power supply and consequently the output radiation power, automatically by sending electronic signals to power supply 126. Controller 124 may send a control signal to power supply element 126 based on the monitoring results. Power supply element 126 may be connected to controller 124 and to irradiation unit 136 and may change the level of the electrical power supplied to irradiation unit 136 to adjust the emitted radiation to a required intensity. For example, power supply element 126 may increase the electrical power to irradiation unit 136 if the output radiation power monitored by sensor 122 may be lower than a certain required output radiation power.

According to embodiments of the invention, controller 124 may issue an alert, for example in the form of a notification to an output device when the highest electrical power possible to receive from power supply is not sufficient to maintain the desired output radiation power of irradiation unit 136. The alert may notify a human operator that irradiation unit 136 or one or more elements of irradiation unit 136 should be replaced.

Figure 4:
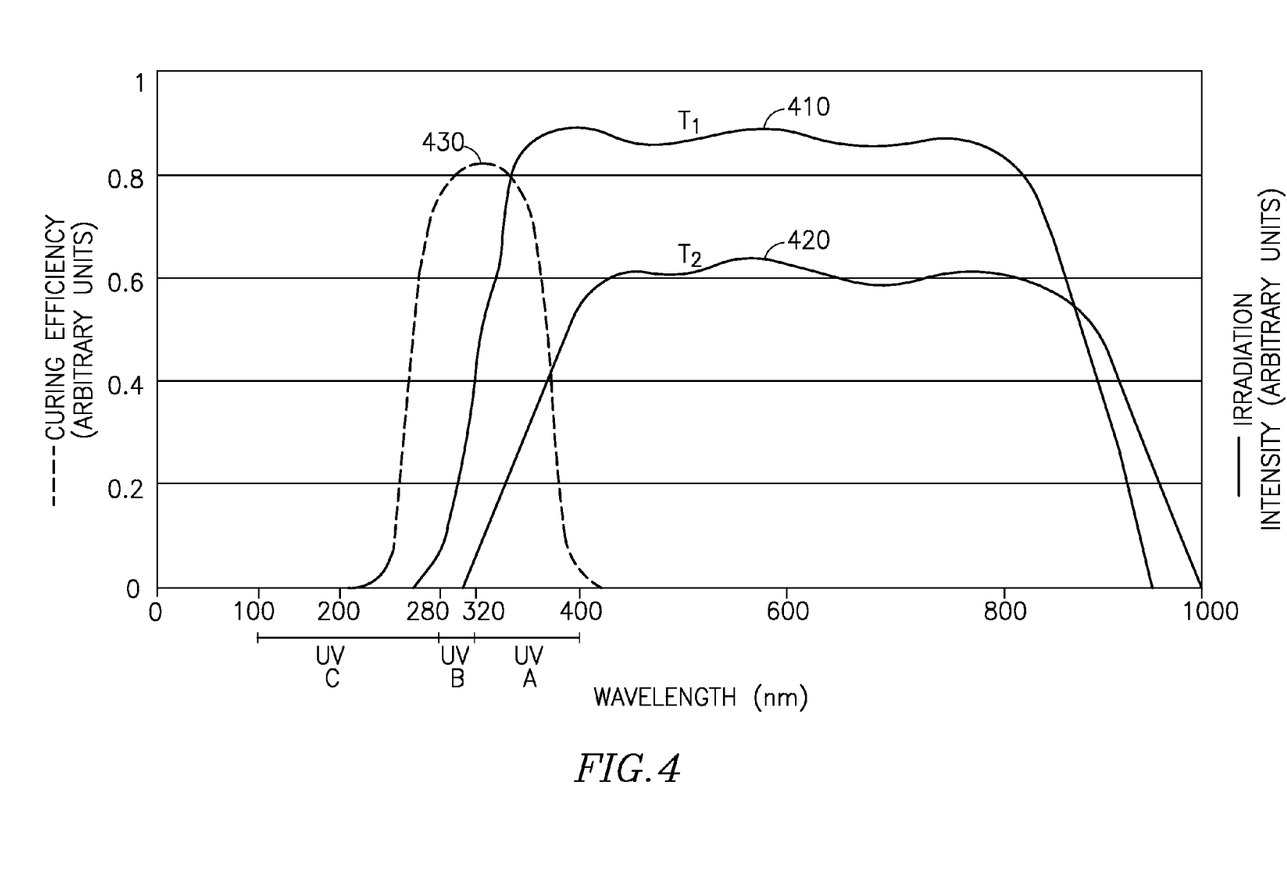
FIG. 4 is a graph representing emission spectrums of an irradiation unit and spectrum of curing efficiency of a curing material demonstrating embodiments of the present invention.

Reference is now made to FIG. 4, illustrating 3 curves helpful in demonstrating embodiments of the present invention. A first curve 410 represents the emission spectrum of an exemplary irradiation unit, e.g., irradiation unit 136 of FIG. 1 at a first time $T_1$ when the irradiation unit is new. Irradiation unit 136 may output E-M radiation, in a wide spectral range. A second curve 420 represents the emission spectrum of the exemplary irradiation unit at a second time $T_2$ representing a time later than the first time and after the irradiation unit has been used. The phenomenon of decrease in efficiency of the irradiation unit is demonstrated by the transition from curve 410 to curve 420. As illustrated, there is a decrease in the intensity of the emitted light at the entire spectrum of the source. There is also a shift of the spectral range of the radiated light towards longer wavelength. As a consequence of the shift, there is a greater decrease of radiation in the UV range relative to the decrease in the full range.

Depending on the specific characteristics and compositions of the building materials used for the formation of the 3D object, a narrower range of the spectrum (narrower than the entire source spectrum) may effectively influence the photo-polymerization process occurring during radiation of the building materials. For example, for an exemplary building material, the effective wavelength range may be around 200 to 400 nm, as illustrated by a third curve 430. This range is composed of small part of UV-C, the entire range of UV-B and three quarters of UV-A. According to embodiment of the invention, given that irradiation unit 136 may be used to cure building materials with such curing behavior, a light sensor 122 with suitable spectral response may be chosen. The proper spectral response may be an intrinsic characteristic of sensor 122, or achieved by adding an optical filter with the required spectral transmission in front of the sensor. Curve 430 may also represent the desired spectral response of sensor 122 that may assure proper measurements of the radiation power which is relevant for curing.

According to embodiments of the present invention, the spectral sensitivity of sensor 122 is selected to match the effective wavelength range. In that case, the calibration of the output radiation power may be performed using a sensor with spectral sensitivity that matches the effective range of the photo-curing process of the building material.

Aging of radiation sources may be characterized by a decrease of overall radiation intensity and also by a shift of the radiation spectral, e.g., wavelength, content towards higher wavelengths. In order to correctly sense the change in curing efficiency of the radiation source during aging, a sensor may not be sensitive to radiation at higher wavelengths than the effective wavelength range. A sensor which may cover or may be sensitive to only a sub-part of the effective wavelength range may at least cover the part of the wavelength range which includes the portion of shorter wavelengths. If only the radiation power in the sub-part of shorter wavelengths is decreased during aging, while the sub-part of higher wavelengths is not, the sensor may sense the decrease of power in the entire wavelength of the effective range.

Figure 5A:
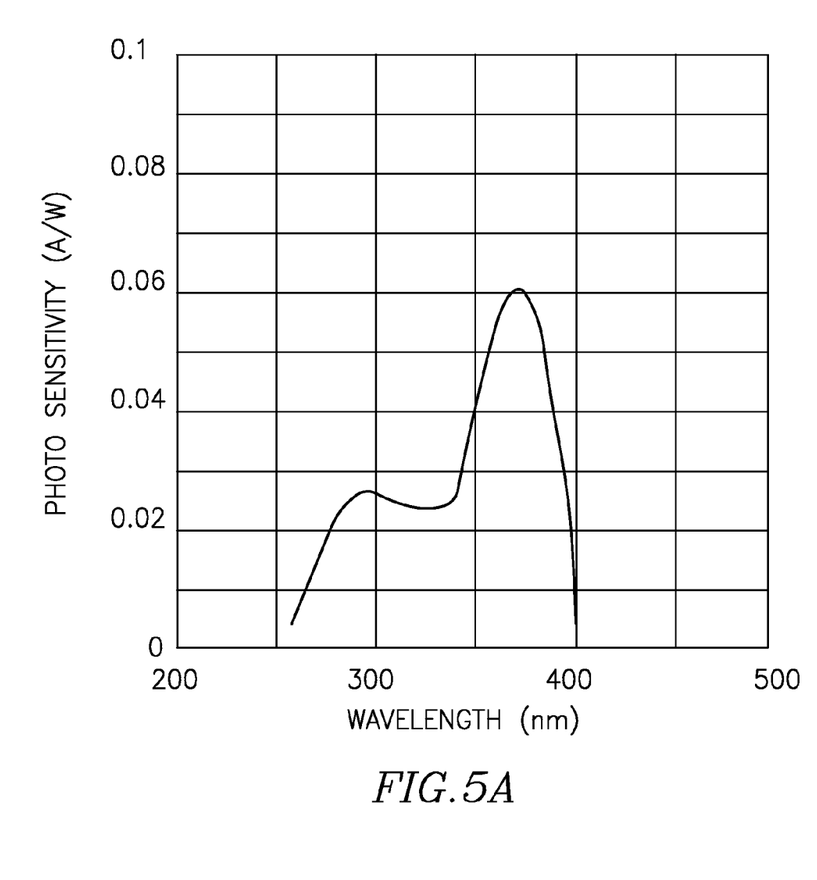
FIGS. 5A-5B are illustrations of spectral sensitivity of photo sensor and emission spectrum of an irradiation unit, respectively helpful in demonstrating embodiments of the invention.
Figure 5B:
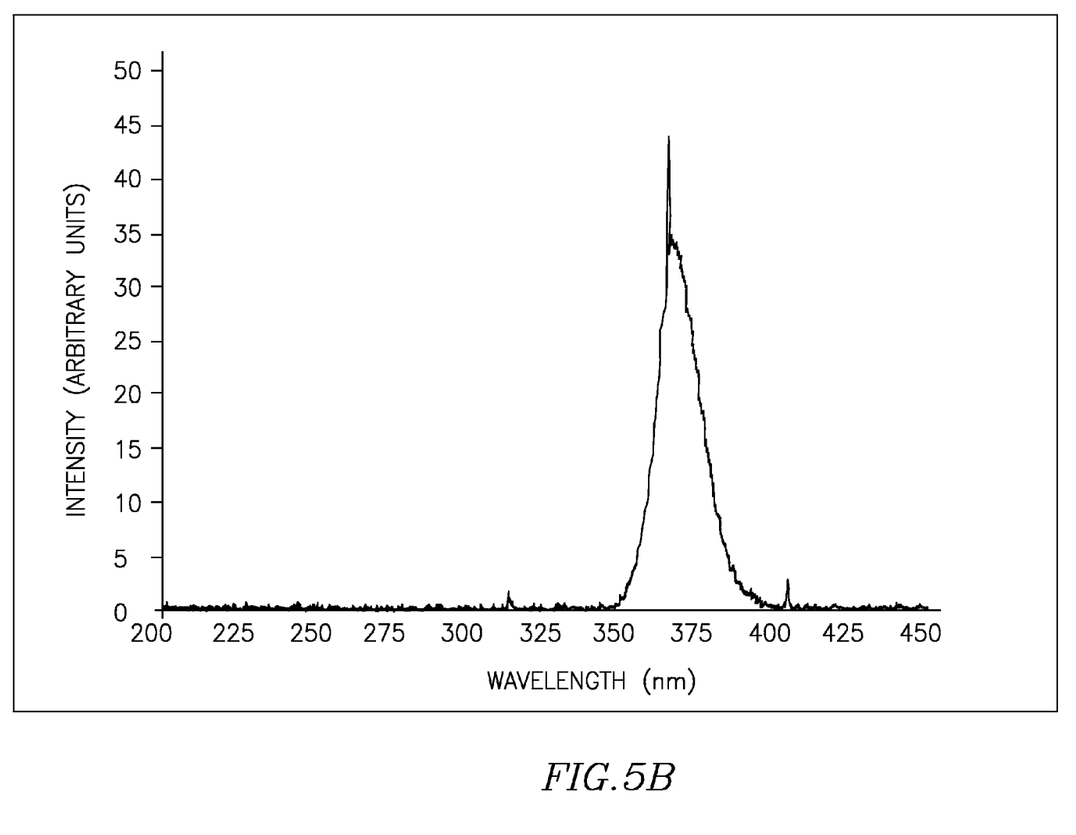
Figure 6:
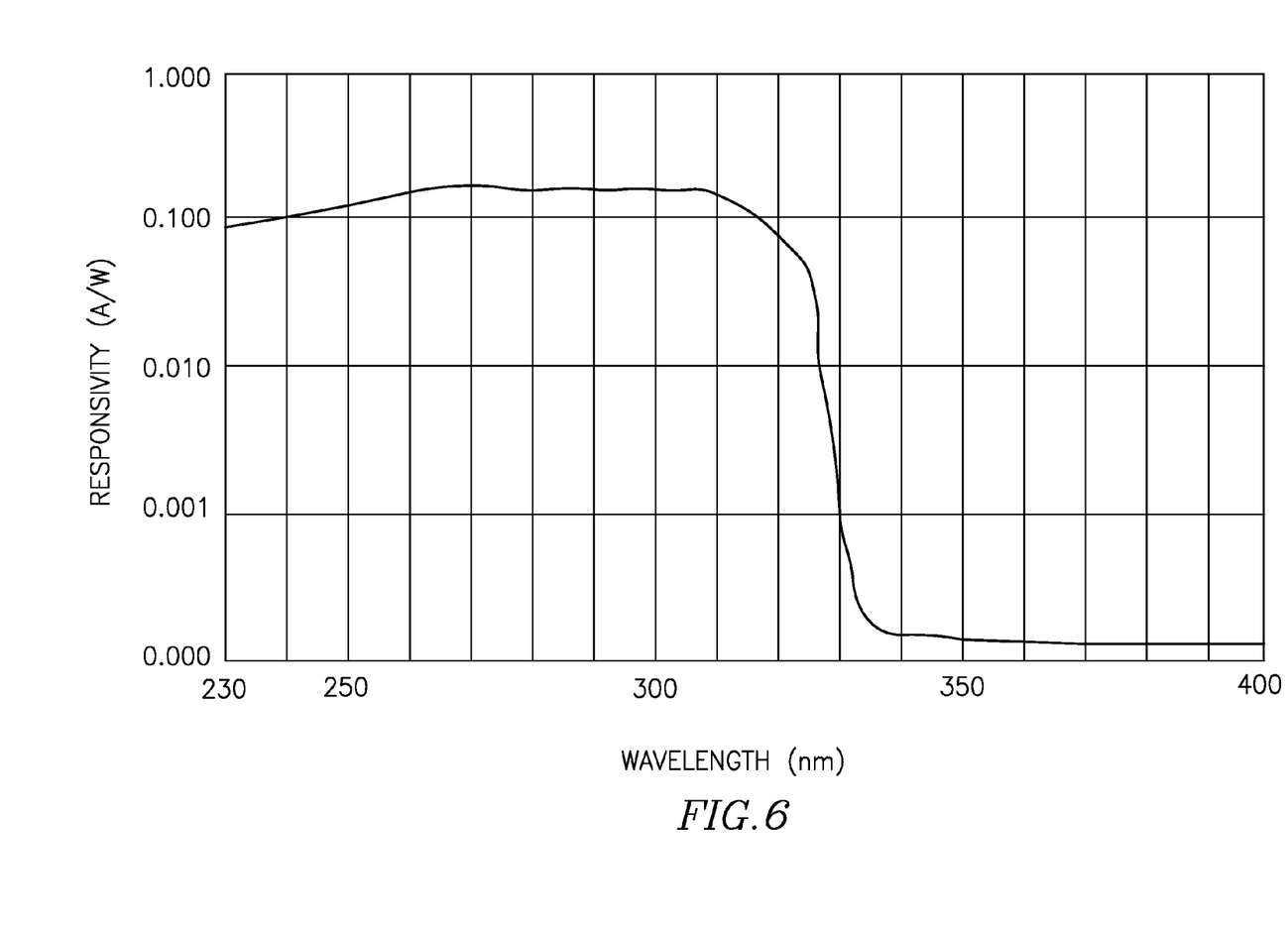
FIG. 6 is an illustration of spectral sensitivity of a photo sensor respective to another building material helpful in demonstrating embodiments of the invention.

The following graphs illustrated by FIGS. 5A-5B and 6 are non-limiting exemplary demonstrations of compatible selection of a sensor to the photo-initiator that may result in a more efficient light monitoring operation. FIGS. 5A-5B graphically illustrate a match between an absorbance spectrum of a photo-initiator sold under the trade name IRGACURE 819™ by Ciba Speciality Chemicals, Basel, Switzerland, the sensitivity range of a radiation sensor sold as Model No. G5842 by Hamamatsu Photonics K.K (FIG. 5A) and the emission spectra of a fluorescent lamp sold as Model No. F8T5BL by USHIO (FIG. 5B).

The absorbance spectrum of the IRGACURE 819™ photo-initiator includes an absorption peak between 360 nm and 380 nm (See for example, U.S. Pat. No. 6,780,546 to Trentler et al.). According to embodiments of the invention both the irradiation unit used to cure a building material having such photo-initiator and the sensor used to monitor and calibrate that irradiation unit may be selected based on the specific absorbance characteristic of the photo-initiator.

FIG. 5A illustrates a graph of the spectral sensitivity of UV sensor Type No G5842 by Hamamatsu, calculated from data published by the manufacturer. The G5842 is a semiconductor UV sensor combining a GaAsP photodiode chip and a UV filter. The spectral range of its maximum sensitivity at ⅔ of the maximum height is between 350 nm to 385 nm. Such sensitivity may correspond well to the absorption peak between 360 nm and 380 nm of the IRGACURE 819™ photoinitiator. In order to provide high efficiency of energy use and therefore low heat dissipation, the source of radiation, e.g., irradiation unit 136 may be selected to match spectral photo activity of the photo-initiator of the building materials.

FIG. 5B illustrates a graph showing the emission spectrum of a fluorescent lamp sold as Model No. F8T5BL by USHIO, calculated from measured data. The emission spectrum of the lamp shows that all the emitted radiation is between 350 nm and 380 nm. This range substantially matches the 360-380 nm range of the absorption peak of the IRGACURE 819™ photoinitiator.

Reference is now made to FIG. 6, which is helpful in demonstrating another non-limiting example of a match between an absorbance spectrum of a photo-initiator sold under the trade name IRGACURE 184™ by Ciba Speciality Chemicals, Basel, Switzerland and the sensitivity range of a radiation sensor sold as Model No. PDU-G102B by Advance Photnix, Inc. The IRGACURE 184™ photoinitiator has an absorbance peak between 225 nm and 255 nm. FIG. 6 illustrates a graph, calculated from data published by the manufacturer of the spectral sensitivity of UV sensor PDU-G102B. PDU-G102B is a GaN UV photodiode with a spectral range from 230 nm to 320 nm. As shown in FIG. 6, this sensor is not sensitive to radiation above 320 nm and therefore may be suitable for measuring output power of wavelengths that are efficient for the excitation of IRGACURE 184™.

According to some embodiments, the building material may include two types of photo-initiators, a first type for initiating polymerization of the upper layers upon radiation and a second type for initiating polymerization at lower layers. The first type may be sensitive to a specific wavelength range, for example, to EM radiation of short wavelengths, and the other may provide polymerization of the lower or inner layers and may be sensitive to longer wavelengths.

Although the invention is not limited in this respect, the polymerization of the upper layers may be more important then the polymerization of the lower layers, therefore the control of the output radiation power of irradiation source 136 may preferably be done according to the spectrum of the short-wavelengths range. For example, the building material may include a first photoinitiator IRGACURE 819™ and the second photoinitiator may be IRGACURE 184™.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method for forming three-dimensional objects, layer by layer, on a fabrication platform, the method comprising:
   printing layers of a three-dimensional object by selectively dispensing a building material, layer by layer, from a printing head and curing deposited layers using an irradiation unit;
   moving the irradiation unit to a service area;
   measuring an output radiation power of the irradiation unit by a first light sensor positioned at the service area, wherein a vertical distance between the first light sensor and the irradiation unit at a time of measuring is the same as a vertical distance, at a time of printing, between the irradiation unit and a top deposited layer of the three-dimensional object being formed; and automatically adjusting an electrical power supplied to the irradiation unit based on information received from the first light sensor.

2. The method of claim 1, wherein the building material has a first curing efficiency within a first range of wavelengths which is higher than a second curing efficiency within a second range of wavelengths and the first light sensor is substantially responsive to radiation at the first range of wavelengths and non-responsive to radiation at the second range of wavelengths.

3. The method of claim 1, wherein the irradiation unit comprises a radiation source positioned within a housing and the method further comprising:

directly measuring an output radiation power of the radiation source by a second sensor located in proximity to the radiation source; and automatically adjusting the electrical power supplied to the irradiation unit based on information received from both the first light sensor and the second sensor.

4. The method of claim 1, wherein the irradiation unit comprises a radiation source positioned within a housing having a transparent window and a reflecting surface and the method further comprising:

directly measuring an output radiation power of the radiation source by a second sensor;

automatically comparing between information received from the first light sensor and information received from the second sensor to determine a status of the transparent window and the reflecting surface; and sending an alert to a system operator if the status of the reflecting surface and the window indicates that human intervention is required.

5. The method of claim 1, wherein the first light sensor is an ultraviolet (UV) sensor responsive in at least part of the range between about 280 nanometers and about 320 nanometers.

6. The method of claim 1, wherein the first light sensor is an ultraviolet (UV) sensor responsive in at least part of the range between 280 nanometers and 400 nanometers.

* * * * *